March 16, 1948.    J. I. BELL    2,437,803
FISH LURE
Filed Dec. 1, 1943
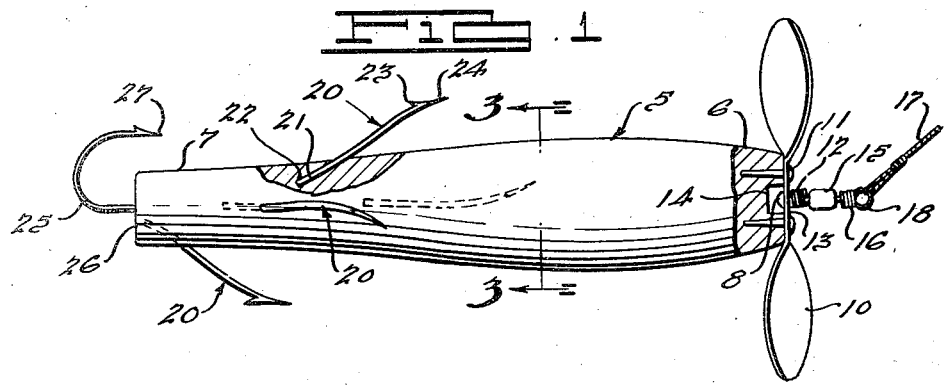
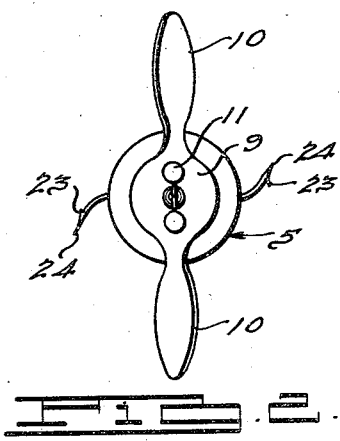
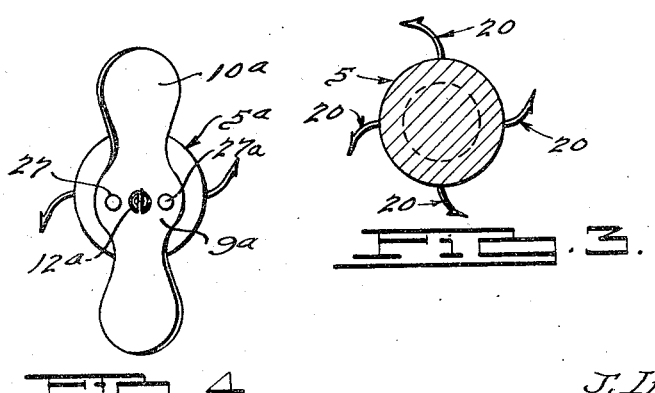
INVENTOR.
J. Irving Bell.
BY Barthel & Bughe
ATTORNEYS.

Patented Mar. 16, 1948

2,437,803

UNITED STATES PATENT OFFICE 2,437,803

FISH LURE

John Irving Bell, Royal Oak, Mich.

Application December 1, 1943, Serial No. 512,425

3 Claims. (Cl. 43—47)

The present invention relates to improvements in fish lures, and more particularly to artificial lures of the spinning minnow type.

The primary object of the invention is to provide a fish lure having increased fish-getting qualities and characteristics and to provide an artificial bait in which the hooks are attached to the body of the lure by being embedded therein with the hook portions extending at an angle to the axis of the body and the free ends bent in the direction of rotation of the lure or artificial bait.

Another object of the invention is to provide an artificial fish lure of the spinning minnow type having propeller blades attached to the body portion of the bait to cause the fish lure to be rotated during its travel through the water as when trolling.

Another object of the invention is to provide an artificial fish lure of the above-mentioned type in which the propeller may be offset with relation to the axis of the body portion of the bait so as to cause the bait to travel in various directions in a zigzag or sinuous path and thereby give the appearance of a darting minnow combined with the spinning action whereby a fish bait or lure will be provided which will present an attractive appearance to fish and thereby enhance the fish-getting qualities of the bait.

Other objects and advantages of the invention will become apparent during the course of the following description of the accompanying drawings, wherein:

Figure 1 is a side elevational view of the fish bait or lure embodying the present invention, illustrating portions thereof broken away in order to show the manner in which the hooks are embedded and the propeller attached to the front end of the bait;

Figure 2 is a front elevational view illustrating the manner in which the propeller is positioned in one form of the invention;

Figure 3 is a transverse cross-sectional view taken on line 3—3 of Fig. 1 looking in the direction of the arrows and illustrating in detail the manner in which the free ends of the hooks are bent in the direction of rotation of the fish lure; and Figure 4 is a front elevational view of a modified form of the invention illustrating a propeller having a slightly modified shape mounted off-center with respect to the axis of the body portion of the lure.

In the drawing, attention will be first directed to Figures 1 to 3 inclusive wherein there is shown one embodiment of the invention and wherein the reference character 5 will generally be employed to designate the body portion of a fish lure which is shaped and is tapered from the centralmost portion to the ends thereof as at 6 and 7. The body portion 5 may be formed of a round piece of material preferably wood or fibrous material or any other relatively lightweight material such as plastics or compositions thereof.

The front end of the body portion 5 terminates in a relatively straight front wall to which is attached the hub portion 9 of a propeller having oppositely extending blades 10. The hub portion 9 is provided with apertures for the passage of anchoring or fastening elements 11 such as nails or the like and the centralmost portion of the hub 9 is provided with a spring member 12 having a rivet portion 8 passing through the portion 13 of the propeller hub 9 for anchoring and securely attaching the spring 12 to the propeller. The front wall of the body portion 5 is cut away as at 14 to provide a recess for the reception of the rivet head 8 as is clearly shown in Figure 1. A swivel connection 15 is attached to the spring 12 and a similar spring 16 is provided on the opposite end of the swivel connection 15 to facilitate the attachment of a leader line 17 thereto by being passed through an eye 18 formed on the spring 16.

The rear portion or tail of the fish lure is provided with a series of barbed impaling members 20 which for want of a better name will be termed "fish hooks" herein, although only of slightly curved form and lacking the reversely curved end portions commonly associated with fish hooks, as shown clearly in Figure 1, the fish hooks 20 have generally straight shanks in that they are only slightly curved and have their inner ends anchored as at 21 in openings 22 formed in the body portion. The openings 22 are formed on an acute angle with respect to the axis of the body portion so that the fish hooks will extend in substantially the same angle and will project in a forward direction toward the front end of the bait 6. The extreme free ends 23 of the fish hooks are barbed and pointed with the free ends bent in the direction of rotation as at 24. If the body portion is formed of a plastic or other composition material, the fish hooks will be embedded therein and securely held against displacement. Such embedding can be carried out during the molding of the body portion of the bait.

The fish hooks 20 may be arranged in staggered circumferential spaced relation about the axis of the body portion with the unembedded portion extending in the direction of bait travel and along the line of axis of the fish bait.

The rear end 7 of the body portion 5 is provided with a hook 25 having its shank portion embedded in the end wall 26 with the free end as at 27 extending forward and slightly bent in the direction of rotation of the fish lure.

In Figure 4, the body portion 5a is formed similar to the body portion shown in Figures 1 to 3 inclusive with the hooks embedded therein and the free ends extending in the direction of rotation of the bait. In the modified form, the shape of the propeller 10a is changed and a stub blade propeller is employed with a hub portion 9a shaped somewhat similar to the hub portion 9 shown in Figures 1 to 3 inclusive. The propeller 10a is provided with a pair of spaced apertures 27a which are offset relative to the center of the hub 9a and on different radii from the swivel connection 12a. It is intended to secure the hub portion 9a of the propeller to the body portion of the fish lure 5a so that the hub will be offset from the axis thereof and thereby impart a wobble motion to the bait as it is being drawn through the water. Simultaneously, the body portion 5a is rotated by the propeller 10a in the same manner as disclosed in connection with the form of the invention shown in Figures 1 to 3 inclusive. Fastening elements or the like may be passed through the offset openings 27a to securely hold the propeller 10a in position on the front wall of the body portion.

It is to be understood that the forms of the invention herewith shown and described are to be considered as preferred embodiments of the same and that various changes in the shape, size and arrangement of parts may be resorted to without departing from the spirit of the invention or the scope of the subjoined claims.

What I claim is:

1. A fish lure comprising a body portion having a series of fish hooks carried thereby, and a propeller mounted on the front of the body portion, said propeller having its axis offset relative to the the axis of said body portion to cause said fish lure to travel through the water in a zigzag path and simultaneously rotate about its own axis.

2. A fish lure comprising an elongated body, a series of barbed fish-impaling members secured to said body with the exposed portions thereof extending forwardly at an angle to said body throughout their entire lengths, means for attaching a line to the forward end of said body, and means for rotating said body, the free ends of said fish-impaling members having a bend sidewise in the direction of rotation of said body.

3. A fish lure comprising an elongated body, a series of barbed fish-impaling members secured to said body with the exposed portions thereof extending forwardly at an angle to said body throughout their entire lengths, and means for attaching a line to the forward end of said body, the rearward ends of said fish-impaling members being imbedded in forwardly-angled recesses in said body.

J. IRVING BELL.

REFERENCES CITED

The following references are of record in the file of this patent:

UNITED STATES PATENTS

| Number | Name | Date |
|---|---|---|
| 1,036,330 | Tileston | Aug. 20, 1912 |
| 261,194 | Wylly | July 18, 1882 |
| 2,079,335 | Pflueger | May 4, 1937 |
| Re. 13,499 | Breder et al. | Dec. 24, 1912 |
| 1,791,084 | Pike | Feb. 3, 1931 |

FOREIGN PATENTS

| Number | Country | Date |
|---|---|---|
| 136,679 | Australia | Feb. 26, 1934 |
| 1,545 | Great Britain | Jan. 28, 1891 |